(12) United States Patent
Scheerer et al.

(10) Patent No.: US 9,141,439 B2
(45) Date of Patent: Sep. 22, 2015

(54) SYSTEM AND METHOD FOR REPORTING A SYNCHRONIZATION EVENT IN A RUNTIME SYSTEM OF A COMPUTER SYSTEM

(75) Inventors: Johannes Scheerer, Heidelberg (DE); Ralf Schmelter, Wiesloch (DE); Michael Wintergerst, Muelhausen (DE); Dietrich Mostowoj, Ludwigshafen (DE); Steffen Schreiber, Frankenthal (DE)

(73) Assignee: SAP SE, Walldorf (DE)

( * ) Notice: Subject to any disclaimer, the term of this patent is extended or adjusted under 35 U.S.C. 154(b) by 123 days.

(21) Appl. No.: 12/901,899

(22) Filed: Oct. 11, 2010

(65) Prior Publication Data

US 2012/0089990 A1    Apr. 12, 2012

(51) Int. Cl.
G06F 9/46    (2006.01)
G06F 9/52    (2006.01)

(52) U.S. Cl.
CPC .............. *G06F 9/522* (2013.01); *G06F 9/526* (2013.01)

(58) Field of Classification Search
None
See application file for complete search history.

(56) References Cited

U.S. PATENT DOCUMENTS

| | | | |
|---|---|---|---|
| 5,931,923 A * | 8/1999 | Roberts | 710/36 |
| 6,681,241 B1 | 1/2004 | Fagen et al. | |
| 6,691,304 B1 * | 2/2004 | Zhang et al. | 717/127 |
| 6,912,553 B1 | 6/2005 | Kolodner et al. | |
| 6,952,825 B1 * | 10/2005 | Cockx et al. | 718/102 |
| 8,117,600 B1 * | 2/2012 | Roeck et al. | 717/128 |
| 2004/0024797 A1 | 2/2004 | Berry et al. | |
| 2005/0010729 A1 * | 1/2005 | Silvera et al. | 711/150 |
| 2006/0010444 A1 | 1/2006 | Seidman et al. | |
| 2006/0085426 A1 * | 4/2006 | Verma et al. | 707/10 |
| 2007/0067777 A1 | 3/2007 | Branda et al. | |
| 2011/0225592 A1 | 9/2011 | Goldin | |

OTHER PUBLICATIONS

Kendo: Efficient Deterministic Multithreading in Software; Marek Olszewski, Jason Ansel, Saman Amarasinghe; ASPLOS Mar. 7-11, 2009.*
"Introduction to Profiling Java Applications in BetBeans IDS", [Online]. Retrieved from the Internet: <URL: http://netbeans.org/kb/docs/java/profiler-intro.html>, (Accessed Aug. 5, 2010), 9 pgs.
"YourKit Java Prifiler Features", [Online]. Retrieved from the Internet: <URL: http://www.yourkit.com/features/index.jsp>, (Apr. 30, 2010), 28 pgs.
"U.S. Appl. No. 12/901,907, Non Final Office Action mailed Dec. 19, 2012", 15 pgs.
Da Silva, Gabriela Jacques, et al., "JRastro: A Trace Agent for Debugging Multithreaded and Distributed Java Programs", (2003).
De Kergommeaux, Chassin J, "Efficient Execution Replay for Athapascan-0 parallel programs", (1999).

(Continued)

*Primary Examiner* — Dong Kim
(74) *Attorney, Agent, or Firm* — Schwegman Lundberg & Woessner, P.A.

(57) ABSTRACT

A system and computer-implemented method for reporting a synchronization event in a runtime system of a computer system. A synchronization primitive in a runtime system of the computer system is monitored. A synchronization operation performed on the synchronization primitive by a thread in the runtime system is detected. An enumerator for the synchronization primitive is incremented when the synchronization operation satisfies predetermined criteria. A synchronization event that includes data relating to the synchronization operation performed on the synchronization primitive is reported.

18 Claims, 10 Drawing Sheets

(56) References Cited

OTHER PUBLICATIONS

Harkema, M, et al., "Performance monitoring of java applications", Online retrieved at http://delivery.acm.org/10.1145/590000/584388/p114-harkema.pdf, (Jul. 2002), 114-127.

Harkema, Marcel, et al., "A Java Performance Monitoring Tool", (Jul. 2002).

Olszewski, Marek, et al., "Kendo: Efficient Deterministic Multithreading in Software", (Mar. 2009).

Xian, Feng, et al., "Investigating Throughput Degradation Behavior of Java Application Servers: A View from Inside a Virtual Machine", (2006).

"U.S. Appl. No. 12/901,907, Response filed Aug. 21, 2013 to Final Office Action mailed May 23, 2013", 15 pgs.

"U.S. Appl. No. 12/901,907, Non Final Office Action mailed Mar. 28, 2014", 13 pgs.

"U.S. Appl. No. 12/901,907, Response filed Apr. 19, 2013 to Non Final Office Action mailed Dec. 19, 2012", 16 pgs.

"U.S. Appl. No. 12/901,907, Final Office Action mailed May 23, 2013", 18 pgs.

"U.S. Appl. No. 12/901,907, Final Office Action mailed Nov. 20, 2014", 17 pgs.

"U.S. Appl. No. 12/901,907, Response filed Apr. 20, 2015 to Final Office Action mailed Nov. 20, 2014", 15 pgs.

"U.S. Appl. No. 12/901,907, Response filed Jul. 28, 2014 to Non Final Office Action maled Mar. 28, 2014", 15 pgs.

"Borland Optimizeit 6: Thread Debugger 1.4 User's Guide", Chapters 1 and 4-6, [Online]. Retrieved from the Internet: <http://techpubs.borland.com/optimizeit/index.html>, (2003), 1-6 and 23-40.

Audleman, Kevin Forbes, et al., "TIV: Thread Interaction Visualizer", (2002), 16 pgs.

Kessis, Mehdi, et al., "Performance Monitoring and Visualization of Large-Sized and Multi-Threaded Applications with the Pajé Framework", (2006), 6 pgs.

\* cited by examiner

7. Release Use

SYSTEM AND METHOD FOR REPORTING A SYNCHRONIZATION EVENT IN A RUNTIME SYSTEM OF A COMPUTER SYSTEM

TECHNICAL FIELD

The disclosed embodiments relate generally to reporting a synchronization event in a runtime system of a computer system.

BACKGROUND

Many processors include multiple processing cores. In order to take advantage of the multiple processing cores of a processor, programmers write multi-threaded applications in which multiple threads of an application are distributed across the processing cores of the processor and executed substantially simultaneously by the cores of the processor. The resources of the processor (e.g., cache memory) are typically shared between the threads of the application. Accordingly, a first thread of the application may attempt to use the same resource as a second thread of the application. In order to maintain consistency of the shared resources, only one thread is allowed to use a shared resource at any given time. All other threads are blocked from using the shared resource and must wait for their turn to use the shared resource. As a result, deadlocks and/or performance bottlenecks may occur because only a subset of the threads can execute in parallel while the other threads wait for the shared resources to become free.

BRIEF DESCRIPTION OF THE DRAWINGS

Like reference numerals refer to corresponding parts throughout the drawings.

DESCRIPTION OF EMBODIMENTS

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

In many runtime systems (e.g., a JAVA Virtual Machine) it is possible to execute several threads concurrently. A first thread can exchange data with a second thread by storing data in a shared data structure that is accessible to both threads. For example, the shared data structured may be stored in shared memory of the runtime system. In order to maintain the consistency of data in the shared data structure, synchronization primitives (e.g., locks, object monitors, etc.) are used to guard the shared data structure in the shared memory. Using these synchronization primitives, it is possible to maintain the consistency of the data by, for example, allowing only one thread to execute a critical section of code that requires use of the shared data structure. All other threads attempting to access the shared data structure are blocked from entering the critical section.

Due to the blocking nature of most synchronization primitives, the throughput and scalability of multi-threaded applications may be severely limited if multiple threads contend for few synchronization primitives. The embodiments described herein allow the user to identify contended synchronization primitives and give the user insight into how long each thread of execution is blocked by other threads that are using a synchronization primitive.

Figure 1A:
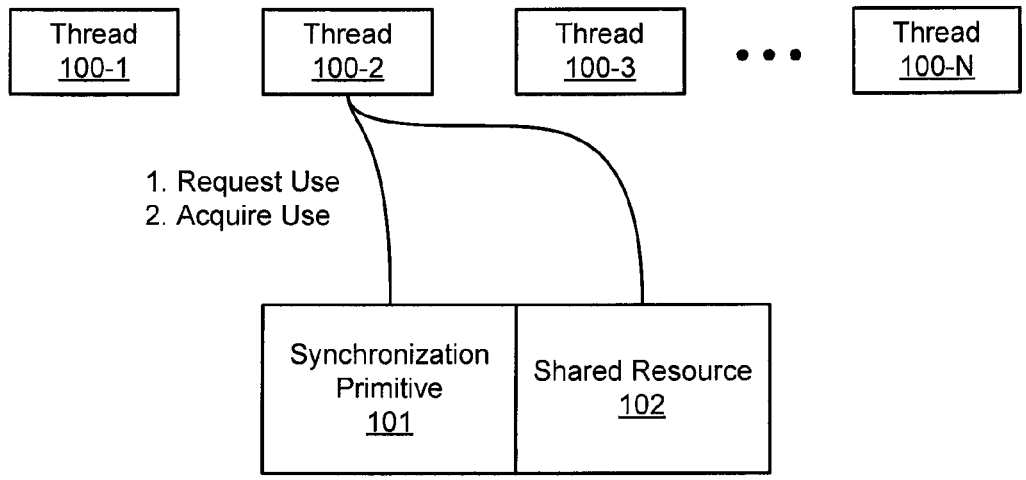
FIG. 1A is a block diagram illustrating a first thread of a multi-threaded application acquiring use of a synchronization primitive for a shared resource, according to some embodiments.

FIGS. 1A-1E are block diagrams illustrating threads 100-1, 100-2, 100-3, ... 100-N of a multi-threaded application that are requesting use of the same shared resource, according to some embodiments. The specification refers to threads of a multi-threaded application executing on a processor. However, it should be understood that the embodiments described herein apply generally to threads of a multi-threaded application being executed on a processor that uses shared resources (e.g., shared memory). For example, the embodiments described herein may apply to threads of a multi-threaded application being executed on a single core of a processor, on multiple processors, on multiple cores of a processor, and/or on multiple cores of multiple processors. In FIG. 1A, a thread 100-2 requires use of a shared resource 102. For example, the thread 100-2 may need to use a shared variable stored within the shared resource 102. The code executed by the thread 100-2 that requires use of the shared resource 102 is typically referred to as "a critical section" of code. In order for the thread 100-2 to use the shared resource 102, the thread 100-2 first requests use of a synchronization primitive 101 that guards the shared resource 102. In some embodiments, a synchronization primitive includes, but is not limited to, a mutex, an object monitor, a lock, a cyclic barrier, and a latch. Note that other types of synchronization primitives may be monitored by the embodiments described herein. In this example, the synchronization primitive 101 is not being used by other threads and the thread 100-2 acquires use of the synchronization primitive 101. Accordingly, the thread 100-2 now has exclusive use of the shared resource 102.

Figure 1B:
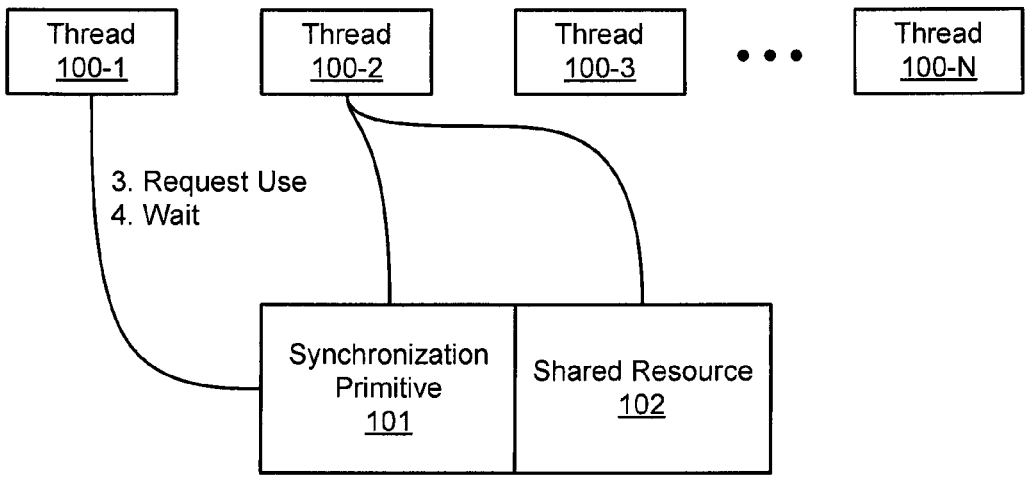
FIG. 1B is a block diagram illustrating a second thread of the multi-threaded application attempting to acquire use of the synchronization primitive for the shared resource, according to some embodiments.

In FIG. 1B, the thread 100-1 requires use of the shared resource 102 and requests use of the synchronization primitive 101. Since the thread 100-2 has not released use of the synchronization primitive 101, the thread 100-1 must wait (e.g., idle) until the thread 100-2 has released use of the synchronization primitive 101.

Figure 1C:
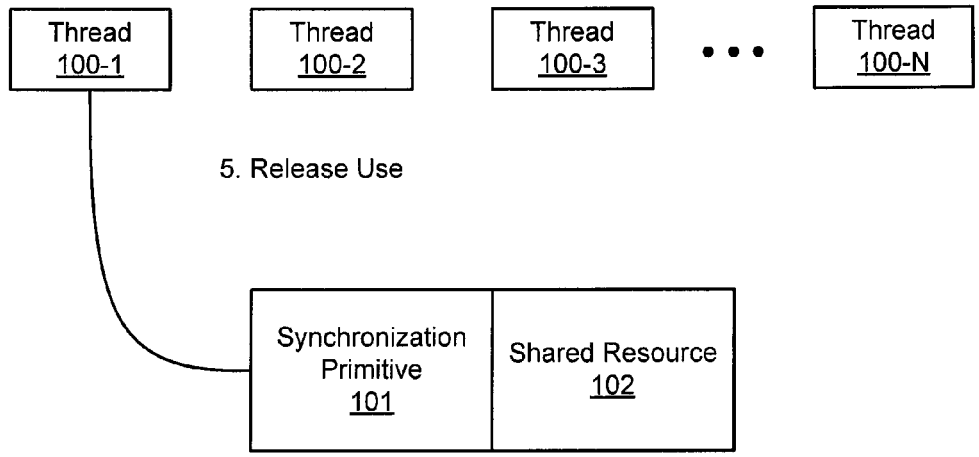
FIG. 1C is a block diagram illustrating the first thread of the multi-threaded application releasing use of the synchronization primitive for the shared resource, according to some embodiments.

In FIG. 1C, the thread 100-2 releases use of the synchronization primitive 101. Accordingly, the thread 100-2 no longer has exclusive use of the shared resource 102.

Figure 1D:
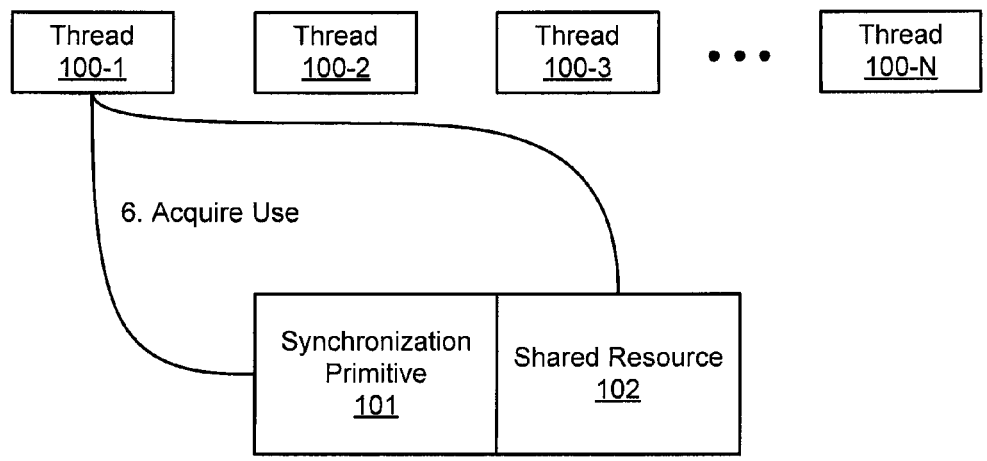
FIG. 1D is a block diagram illustrating the second thread of the multi-threaded application acquiring use of the synchronization primitive for the shared resource, according to some embodiments.

In FIG. 1D, since the thread 100-2 has released use of the synchronization primitive 101, the thread 100-1 acquires use of the synchronization primitive 101. Accordingly, the thread 100-1 now has exclusive use of the shared resource 102.

Figure 1E:
FIG. 1E is a block diagram illustrating the second thread of the multi-threaded application releasing use of the synchronization primitive for the shared resource, according to some embodiments.
Figure 1E:
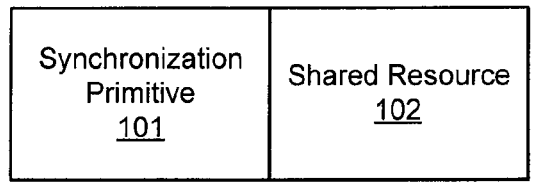

In FIG. 1E, the thread 100-1 releases use of the synchronization primitive 101.

Note that requesting, acquiring, and releasing use of a synchronization primitive are each referred to as a synchronization operation herein. In some embodiments, a synchronization event is emitted to a synchronization trace when a thread performs a synchronization operation involving a synchronization primitive.

In some embodiments, a synchronization primitive is used to guard a shared resource. In these embodiments, the synchronization operation may be an operation that requests use of the synchronization primitive and the corresponding synchronization event is an enter event corresponding to a time when the thread attempts to enter a critical section by requesting use of a synchronization primitive. The synchronization operation may also be an operation that acquires use of a synchronization primitive and the corresponding synchronization event is an entered event corresponding to a time when the thread enters the critical section by acquiring use of the synchronization primitive. The synchronization operation may also be an operation that releases use of a synchronization primitive and the corresponding synchronization event is an exit event corresponding to a time when the thread exits the critical section by releasing use of the synchronization primitive.

In some embodiments, a synchronization primitive is used to notify threads of changed conditions. In these embodiments, the synchronization operation may be an operation that waits for a change in a state of the synchronization primitive and the corresponding synchronization event is a wait event corresponding to a time when the thread starts waiting for a change in a state of the synchronization primitive. The synchronization operation may also be an operation that stops waiting for a change in the state of the synchronization primitive and the corresponding synchronization event is a waited event corresponding to a time when the thread has finished waiting for the change in the state of the synchronization primitive. The synchronization operation may also be an operation that notifies at least one other thread that the state of the synchronization primitive has changed and the corresponding synchronization event is a notify event corresponding to a time when the thread attempts to notify at least one other thread that the state of the synchronization primitive has changed.

Synchronization primitives that are used to notify threads of change conditions (e.g., java.lang.Object.wait( ) and java.lang.Object.notify( ) for JAVA), usually provide a mechanism to limit the amount of time a thread waits before the thread continues execution. Therefore, wait events include the deadline of the waiting period. To distinguish between the possible outcomes when a synchronization primitive is used for notification, a waited event may include one of the following exit types:

Notified: used when the current thread received a notification of a changed condition from another thread;

Timed Out: used when the provided deadline was exceeded without the current thread receiving a notification of a changed condition from another thread;

Interrupted: used when the current thread is interrupted, while waiting for a notification, via an interrupt mechanism of the runtime environment (e.g., java.lang.Thread.interrupt( ) for the JAVA); and Spurious Wakeup: used when the current thread incorrectly perceives a notification and/or a wakeup call from another thread when the other thread did not notify and/or wake up the current thread.

Notify events may also include additional thread identifiers. For example, the additional thread identifiers may include thread identifiers for threads that the current thread notified. Depending on the synchronization primitive, the number of threads may be: zero (e.g., no thread was notified because no thread was waiting for a changed condition), one (e.g., exactly one thread was notified of a changed condition), or several (e.g., more than one thread was notified of a changed condition).

In some embodiments, the runtime environment provides monitoring functions to monitor synchronization primitives. Whereas third-party application programming interfaces (APIs) allow a programmer to monitor system calls corresponding to synchronization operations (e.g., a wait( ) call), the monitoring functions of the runtime environment also allow a programmer to obtain information about the synchronization primitives themselves. Since these monitoring functions are provided by the runtime environment, the monitoring functions may also include more information about the contention of synchronization primitives and/or shared resources that are not available with third-party APIs. For example, the monitoring functions may include an accumulated timestamp that indicates the accumulated amount of time that the processor spent performing the runtime environment functions and/or a synchronization primitive enumerator that allows the runtime system to correctly order the sequence of synchronization events.

The monitoring functions of the runtime system emit synchronization events to a synchronization trace in response to detecting synchronization operations performed by threads executing in the runtime system. In some embodiments, the synchronization events emitted to the synchronization trace are used by a synchronization user interface module to display synchronization information relating to contention of synchronization primitives and/or shared resources in the runtime system. Each synchronization event may include, but is not limited to, a synchronization event timestamp corresponding to a time at which a synchronization event was emitted to the synchronization trace, an accumulated timestamp corresponding to the accumulated amount of time that the processor spent performing the runtime environment functions at the time that the synchronization event was emitted to the synchronization trace, a value of a synchronization primitive enumerator for the synchronization primitive corresponding to the synchronization event at the time that the synchronization operation was performed, an identifier for a thread corresponding to the synchronization event, an identifier for a current thread that has acquired use of a synchronization primitive that the thread corresponding to the synchronization event requires, an identifier for a next thread that will acquire use of the synchronization primitive that the thread corresponding to the synchronization event requires, and a maximum amount of time that the thread may wait to acquire use of the synchronization primitive. Using the synchronization event timestamp, the accumulated timestamp, and the synchronization primitive enumerator, the synchronization user interface module may display information including, but not limited to, a list of threads that a first thread blocks, an amount of time that the first thread blocks each of the threads in the list of threads, a number of times that the first thread blocks each of the threads in the list of threads, a list of threads blocking a first thread, an amount of time that each of the threads in the list of threads blocks the first thread, a number of times that each of the threads in the list of threads blocks the first thread, a list of threads that a synchronization primitive blocks, an amount of time that the synchronization primitive blocks each thread in the list of threads, a number of times that the synchronization primitive blocks each thread in the list of threads, a list of methods blocking a first method, an amount of time that each of the methods in the list of methods blocks the first method, and a number of times that each of the methods in the list of methods blocks the first method.

Figure 2A:
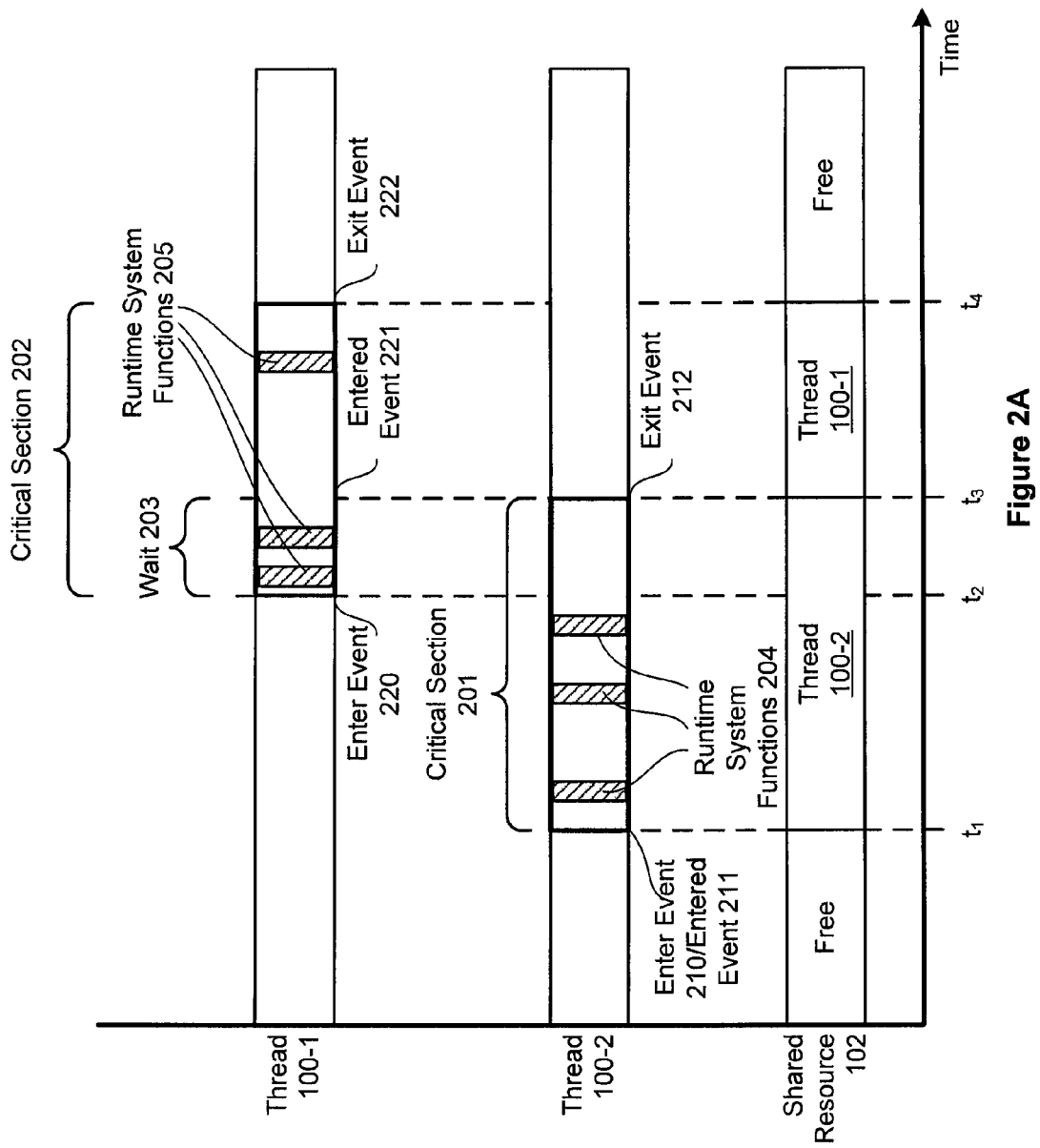
FIG. 2A is a timing diagram illustrating the calculation of a time in which a first thread of a multi-threaded application is blocked by a second thread of the multi-threaded application, according to some embodiments.
Figure 2B:
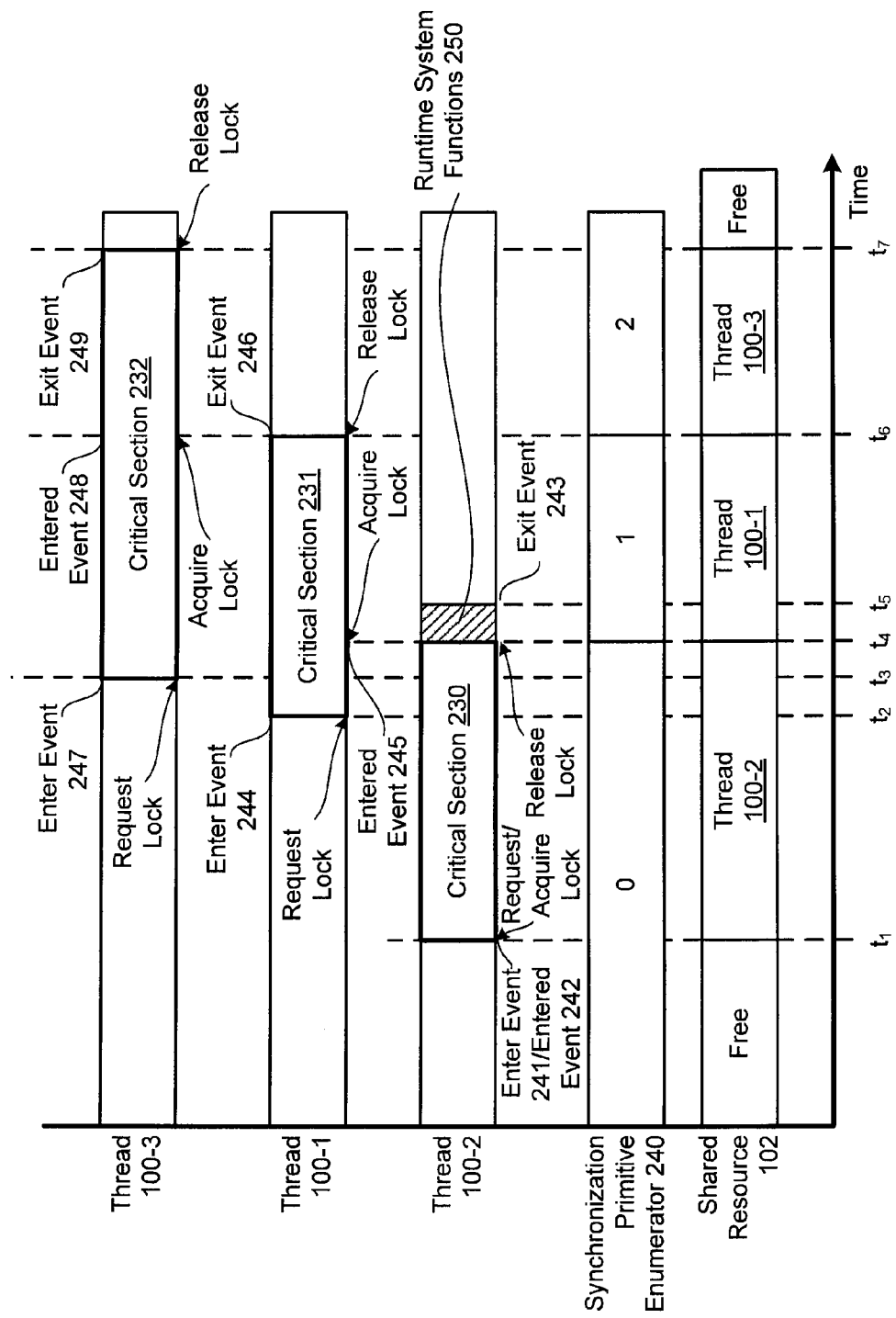
FIG. 2B is a timing diagram illustrating the identification of the order that threads of a multi-threaded application block other threads of the multi-threaded application, according to some embodiments.

At least two issues arise when attempting to display information about synchronization information relating to contention of synchronization primitives and/or shared resources. First, an amount of time that a first thread is blocked by a second thread may not correspond to a time interval between a time when the first thread requests use of a synchronization primitive guarding a shared resource and a time when the first thread acquires use of the synchronization primitive guarding the shared resource. This issue and a solution to this issue are illustrated in FIG. 2A. Second, an order in which synchronization events are emitted to a synchronization trace may not correspond to an order that the synchronization operations corresponding to the synchronization events actually occurred in the runtime system. This issue and a solution to this issue are illustrated in FIG. 2B.

FIG. 2A is a timing diagram illustrating the calculation of a time in which the thread 100-1 attempts to execute a critical section 202 that requires use of a shared resource 102, but is blocked by the thread 100-2, which is executing a critical section 201 that is using the shared resource 102, according to some embodiments. As illustrated in FIG. 2A, before time $t_1$, the shared resource 102 is free (e.g., not used by any threads). At time $t_1$, the thread 100-2 attempts to enter the critical section 201 by performing a synchronization operation that requests use of the synchronization primitive 101 that guards the shared resource 102. The monitoring functions of the runtime environment emit, to a synchronization trace, an enter event 210 corresponding to the synchronization operation that requests use of the synchronization primitive 101 that guards the shared resource 102. Since the shared resource 102 is currently free, the thread 100-2 enters the critical section 201 by performing a synchronization operation that acquires use of the synchronization primitive 101 that guards the shared resource 102. The monitoring functions of the runtime environment emit, to the synchronization trace, an entered event 211 corresponding to the synchronization operation that acquires use of the synchronization primitive 101 that guards the shared resource 102.

At time $t_2$, the thread 100-1 attempts to enter the critical section 202 by performing a synchronization operation that requests use of the synchronization primitive 101 that guards the shared resource 102. However, since the thread 100-2 is currently using the shared resource 102, the thread 100-1 waits until the synchronization primitive 101 that guards the shared resource 102 becomes free. The monitoring functions of the runtime environment emit, to the synchronization trace, an enter event 220 corresponding to the synchronization operation that requests use of the synchronization primitive 101 that guards the shared resource 102.

At time $t_3$, the thread 100-2 exits the critical section 201 by performing a synchronization operation that releases use of the synchronization primitive 101 that guards the shared resource 102. The monitoring functions of the runtime environment emit, to the synchronization trace, an exit event 212 corresponding to the synchronization operation that releases use of the synchronization primitive 101 that guards the shared resource 102. After the thread 100-2 releases use of the synchronization primitive 101 that guards the shared resource 102 (e.g., at the next clock edge of a processor, within a predetermined time period after the release of the synchronization primitive 101, etc.), the thread 100-1 enters the critical section 202 by performing a synchronization operation that acquires use of the synchronization primitive 101 that guards the shared resource 102. The monitoring functions of the runtime environment emit, to the synchronization trace, an entered event 221 corresponding to the synchronization operation that acquires use of the synchronization primitive 101 that guards the shared resource 102.

At time $t_4$, the thread 100-1 exits the critical section 202 by performing a synchronization operation that releases use of the synchronization primitive 101 that guards the shared resource 102. The monitoring functions of the runtime environment emit, to the synchronization trace, an exit event 222 corresponding to the synchronization operation that releases use of the synchronization primitive 101 that guards the shared resource 102

As illustrated in FIG. 2A, the shared resource 102 is not used before time $t_1$, is used exclusively by thread 100-2 between times $t_1$ and time $t_3$, is used exclusively by thread 100-1 between times $t_3$ and $t_4$, and is free after time $t_4$.

Also, as illustrated in FIG. 2A, the time interval wait 203 (between times $t_2$ and $t_3$) includes the time that the thread 100-1 waits 203 for the shared resource 102 due to the fact that the thread 100-2 is blocking the thread 100-1 from using the shared resource 102. However, the time interval wait 203 also includes the time the processor is performing runtime system functions 204 and/or runtime system functions 205. Runtime system functions 204 and/or the runtime system functions 205 may include functions that are not called by a user application. For example, the runtime system functions 204 and 205 may include, but are not limited to, garbage collection functions, functions that generate stack traces of threads, functions that inspect memory, functions that dump memory, etc. The runtime system functions 204 and 205 may occur periodically or randomly during execution of the multi-threaded application and affect the accuracy of the determination of the time that the thread 100-2 blocks the thread 100-1. For example, the runtime system functions 205 may not be executed during the time interval wait 203. Similarly, only a subset of the runtime system functions 205 illustrated in FIG. 2A may be executed during the time interval wait 203. Thus, when the multi-threaded application is analyzed over several successive runs of the multi-threaded application (or over several successive iterations of the execution of the critical sections 201 and 202), the amount of time that the processor spent executing runtime system functions 204 and 205 may vary from run-to-run (or iteration-to-iteration). Accordingly, in some embodiments, when determining the amount of time that the thread 100-2 blocks the thread 100-1, the amount of time that the processor executes runtime system functions 204 and 205 during the time interval wait 203 is subtracted from the time interval wait 203.

As discussed above, an order in which the synchronization events are emitted to the synchronization trace may not correspond to an order in which the synchronization operations corresponding to the synchronization events actually occurred. For example, the synchronization operations may be emitted to the synchronization trace when shared resources are highly contended. FIG. 2B is a timing diagram illustrating the identification of the order that threads of a multi-threaded application block other threads of the multi-threaded application, according to some embodiments. As illustrated in FIG. 2B, before time $t_1$, the shared resource 102 is free (e.g., not used by any threads). At time $t_j$, the thread 100-2 attempts to enter the critical section 230 by performing a synchronization operation that requests use of the synchronization primitive 101 that guards the shared resource 102. The monitoring functions of the runtime environment emit, to a synchronization trace, an enter event 241 corresponding to the synchronization operation that requests use of the synchronization primitive 101 that guards the shared resource 102. Since the shared resource 102 is currently free, the thread 100-2 enters the critical section 230 by performing a synchronization operation that acquires use of the synchronization primitive 101 that guards the shared resource 102. The monitoring functions of the runtime environment emit, to the synchronization trace, an entered event 242 corresponding to the synchronization operation that acquires use of the synchronization primitive 101 that guards the shared resource 102. Note that although FIG. 2B refers to the term "lock" (e.g., "request lock", "acquire lock", "release lock"), any type of synchronization primitive may be used.

At time $t_2$, the thread 100-1 attempts to enter the critical section 231 by performing a synchronization operation that requests use of the synchronization primitive 101 that guards the shared resource 102. However, since the thread 100-2 is currently using the shared resource 102, the thread 100-1 waits until the synchronization primitive 101 that guards the shared resource 102 becomes free. The monitoring functions of the runtime environment emit, to the synchronization trace, an enter event 244 corresponding to the synchronization operation that requests use of the synchronization primitive 101 that guards the shared resource 102.

At time $t_3$, the thread 100-3 attempts to enter the critical section 232 by performing a synchronization operation that requests use of the synchronization primitive 101 that guards the shared resource 102. However, since the thread 100-2 is currently using the shared resource 102, the thread 100-3 waits until the synchronization primitive 101 that guards the shared resource 102 becomes free. The monitoring functions of the runtime environment emit, to the synchronization trace, an enter event 247 corresponding to the synchronization operation that requests use of the synchronization primitive 101 that guards the shared resource 102.

Based on the synchronization operations (e.g., requesting a lock, acquiring a lock, releasing a lock, etc.) that have occurred by time $t_3$, the thread 100-2 blocks the thread 100-1, and the threads 100-2 and 100-1 block the thread 100-3. However, the ordering of the synchronization events is determined using the time when the synchronization event is emitted and not when the synchronization operation is performed. Times $t_4$ and $t_5$ illustrate how an incorrect ordering of the synchronization events may result in an incorrect set of blocking threads.

At time $t_4$, the thread 100-2 exits the critical section 230 by performing a synchronization operation that releases use of the synchronization primitive 101 that guards the shared resource 102. Also shortly after time $t_4$ (e.g., at the next clock edge of a processor, within a predetermined time period after the release of the synchronization primitive 101, etc.), the thread 100-1 enters the critical section 231 by performing a synchronization operation that acquires use of the synchronization primitive 101 that guards the shared resource 102. The monitoring functions of the runtime environment emit, to the synchronization trace, an entered event 245 corresponding to the synchronization operation that acquires use of the synchronization primitive 101 that guards the shared resource 102. However, instead of emitting an exit event 243 at time $t_4$, one or more runtime system functions 250 delay the monitoring functions of the runtime environment from emitting the exit event 243 until time $t_5$. This behavior occurs because it is desirable to reduce the amount of code (and the corresponding execution time of the code) between acquiring a synchronization primitive and releasing the synchronization primitive to reduce the amount of time that a synchronization primitive (and/or shared resource) is blocked. Accordingly, code that reports an exit event is typically executed after the release of the synchronization primitive. As illustrated in FIG. 2B, at time $t_5$, the monitoring functions of the runtime environment emit, to the synchronization trace, the exit event 243 corresponding to the synchronization operation that releases use of the synchronization primitive 101 that guards the shared resource 102. Thus, the exit event 243 occurs after the entered event 245. This ordering of synchronization events produces results that are not consistent with the order in which the corresponding synchronization operations actually occurred in the runtime system.

At time $t_6$, the thread 100-1 exits the critical section 231 by performing a synchronization operation that releases use of the synchronization primitive 101 that guards the shared resource 102. The monitoring functions of the runtime environment emit, to the synchronization trace, an exit event 246 corresponding to the synchronization operation that releases use of the synchronization primitive 101 that guards the shared resource 102. Shortly after time $t_6$ (e.g., at the next clock edge of a processor, within a predetermined time period after the release of the synchronization primitive 101, etc.), the thread 100-3 enters the critical section 232 by performing a synchronization operation that acquires use of the synchronization primitive 101 that guards the shared resource 102. The monitoring functions of the runtime environment emit, to the synchronization trace, an entered event 248 corresponding to the synchronization operation that acquires use of the synchronization primitive 101 that guards the shared resource 102.

At time $t_7$, the thread 100-3 exits the critical section 232 by performing a synchronization operation that releases use of the synchronization primitive 101 that guards the shared resource 102. The monitoring functions of the runtime environment emit, to the synchronization trace, an exit event 249 corresponding to the synchronization operation that releases use of the synchronization primitive 101 that guards the shared resource 102.

As illustrated in FIG. 2B, the shared resource 102 is not used before time $t_1$, is used exclusively by thread 100-2 between times $t_1$ and time $t_4$, is used exclusively by thread 100-1 between times $t_4$ and $t_6$, is used exclusively by the thread 100-3 between times $t_6$ and $t_7$, and is free after time $t_7$.

To correctly report the sequence of synchronization operations performed in the runtime system, some embodiments provide a synchronization primitive enumerator for a synchronization primitive that is incremented when the synchronization operation satisfies predetermined criteria. In some embodiments, the synchronization operation satisfies predetermined criteria when the synchronization operation is an operation that releases the synchronization primitive. In some embodiments, the synchronization primitive enumerator is only incremented when at least one other thread is awaiting use of the synchronization primitive. In other words, the synchronization primitive enumerator is only incremented when at least two threads are contending for use of the synchronization primitive. In some embodiments, the synchronization primitive enumerator is incremented when a number of threads awaiting use of the synchronization primitive becomes less than or equal to one. These embodiments account for the situation in which a synchronization primitive is in an inflated state when two or more threads are contending for the synchronization primitive and reverts to a deflated state when zero or one thread is using the synchronization primitive.

Exemplary values of the synchronization primitive enumerator 240 are illustrated in FIG. 2B. For example, assuming that a value of a synchronization primitive enumerator 240 is zero before time $t_1$, the synchronization primitive enumerator 240 is incremented by one when the thread 100-2 releases the synchronization primitive 101 because the synchronization primitive 101 is in an inflated state starting at time $t_2$ (e.g., both the threads 100-1 and 100-2 are contending for use of the synchronization primitive 101). The synchronization primitive enumerator 240 is incremented by one again when the thread 100-1 releases the synchronization primitive 101. However, unlike the previous incrementing of the synchronization primitive enumerator 240, this incrementing of the synchronization primitive enumerator 240 is due to the synchronization primitive 101 transitioning from an inflated state to a deflated state. After the synchronization primitive 101 is in the deflated state, the synchronization primitive enumerator 240 is no longer incremented when threads release the synchronization primitive 101. For example, a value of the synchronization primitive enumerator 240 remains the same when the thread 100-3 releases the synchronization primitive 101. The synchronization primitive enumerator 240 may be incremented again when the synchronization primitive 101 is in the inflated state and a thread releases use of the synchronization primitive 101. Note that although the discussion above refers to incrementing the synchronization primitive enumerator 240 when threads release the synchronization primitive 101, the synchronization primitive enumerator 240 may be incremented in response to other synchronization operations.

Using the synchronization primitive enumerator 240, the correct ordering of the synchronization events is now achieved. Specifically, the value of the synchronization primitive enumerator 240 for the exit event 243 is 0 and the value of the entered event 245 is 1. Thus, the exit event 243 is determined to occur before the entered event 245.

In some embodiments, the synchronization event includes a value of a synchronization primitive enumerator at the time that the synchronization operation occurred. In other words, the value of the synchronization primitive enumerator is not the value at the time the synchronization event is emitted, but is instead the value of the synchronization primitive enumerator at the time the synchronization event (e.g., when requesting use of the synchronization primitive, when acquiring use of the synchronization primitive, when releasing use of the synchronization primitive, etc.) occurred.

The embodiments described with respect to FIG. 2B are described in more detail with respect to FIG. 7 below.

Figure 3:
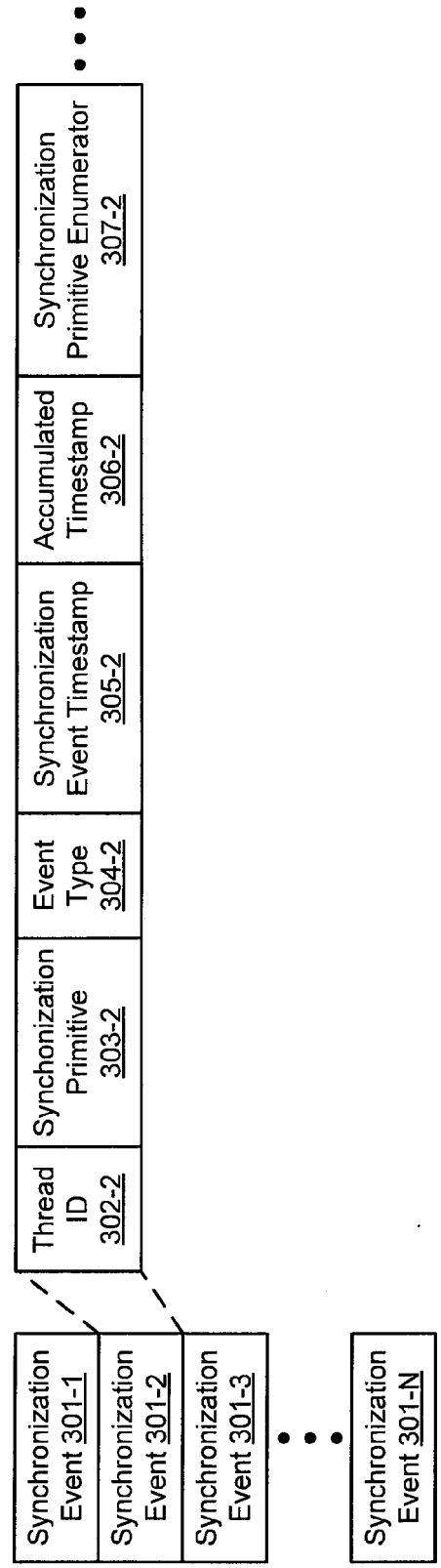
FIG. 3 is a block diagram illustrating a synchronization event data structure, according to some embodiments.

Attention is now directed to FIG. 3, which is a block diagram illustrating a synchronization event data structure, according to some embodiments. The synchronization event data structure includes synchronization events 301. A respective synchronization event 301 includes a thread identifier 302 identifying a thread corresponding to a synchronization operation, a synchronization primitive 303 identifying a synchronization primitive on which the synchronization operation is performed, an event type 304 identifying the type of synchronization operation being performed, a synchronization event timestamp 305 identifying a time that the synchronization operation is reported to the runtime system (e.g., a time when the synchronization event is emitted to the synchronization trace), an accumulated timestamp 306 indicating an accumulated amount of time that the processor has performed runtime system functions at the time the synchronization operating is reported to the runtime system, and a synchronization primitive enumerator 307 identifying an ordering of a sequence of synchronization operations performed on the synchronization primitive. In some embodiments, the synchronization events 301 include stack traces for respective threads associated with the respective synchronization event.

Figure 4:
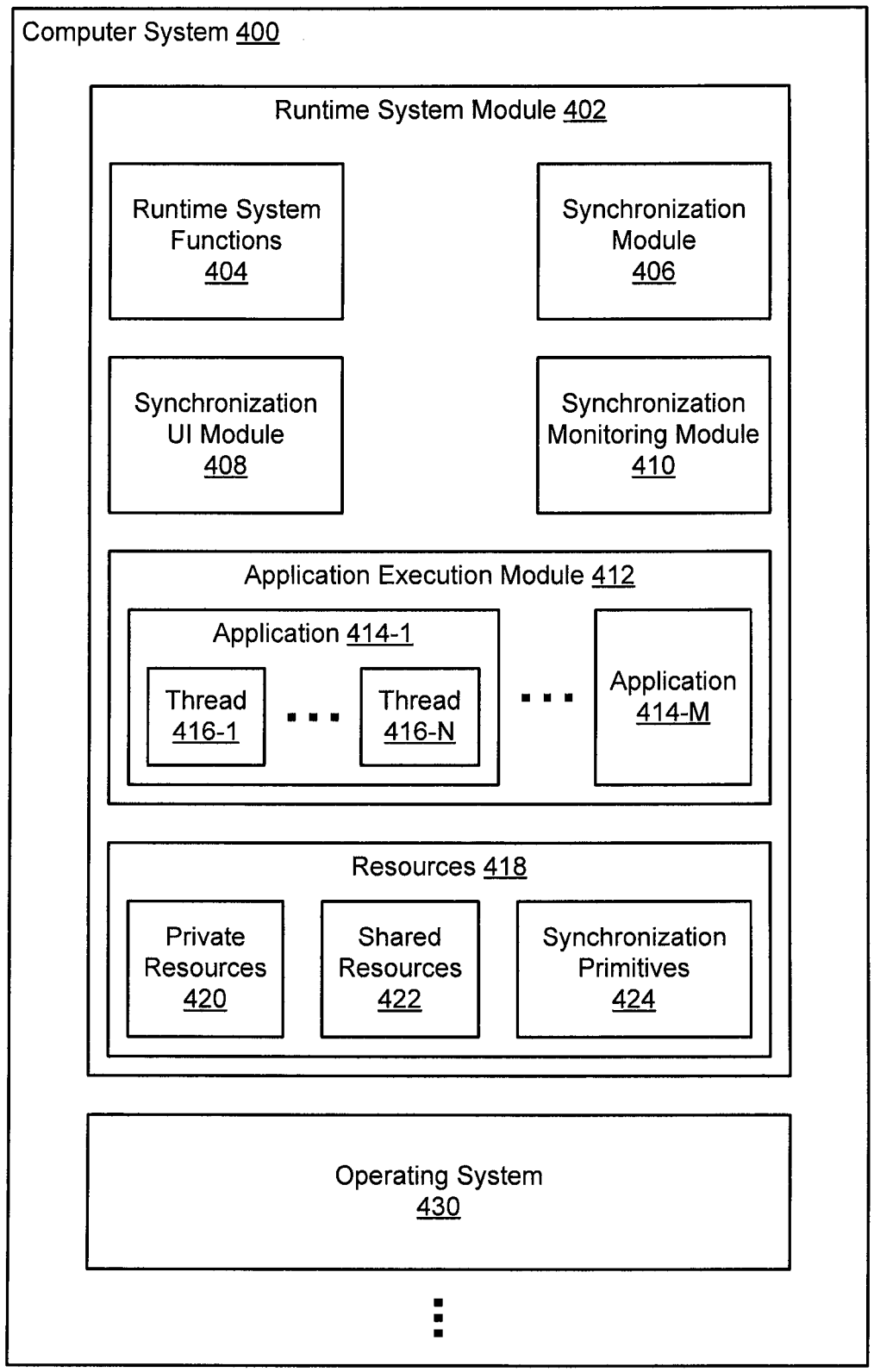
FIG. 4 is a block diagram illustrating modules of a computer system, according to some embodiments.
Figure 5:
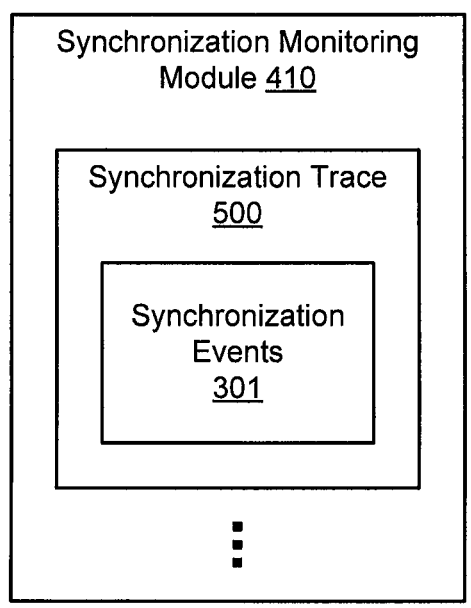
FIG. 5 is a block diagram illustrating a synchronization module, according to some embodiments.

FIG. 4 is a block diagram illustrating modules of a computer system 400, according to some embodiments. The computer system 400 includes a runtime system module 402 including runtime system functions 404, a synchronization module 406 configured to perform synchronization operations on synchronization primitives 424, a synchronization user interface (UI) module 408 configured to display information relating to synchronization events in the runtime system module 402, a synchronization monitoring module 410 configured to monitor synchronization primitives in the runtime system module 402, an application execution module 412 to execute at least one multi-threaded application 414 in which multiple threads 416 are executed substantially concurrently within the runtime system module 402, and resources 418 including private resources 420, shared resources 422, and synchronization primitives 424 corresponding to the shared resources 422. Referring to FIG. 5, in some embodiments, the synchronization monitoring module 410 is configured to emit synchronization events 301 to a synchronization trace 500.

The computer system 400 also includes an operating system 430 that includes procedures for handling various basic system services and for performing hardware dependent tasks.

Figure 6:
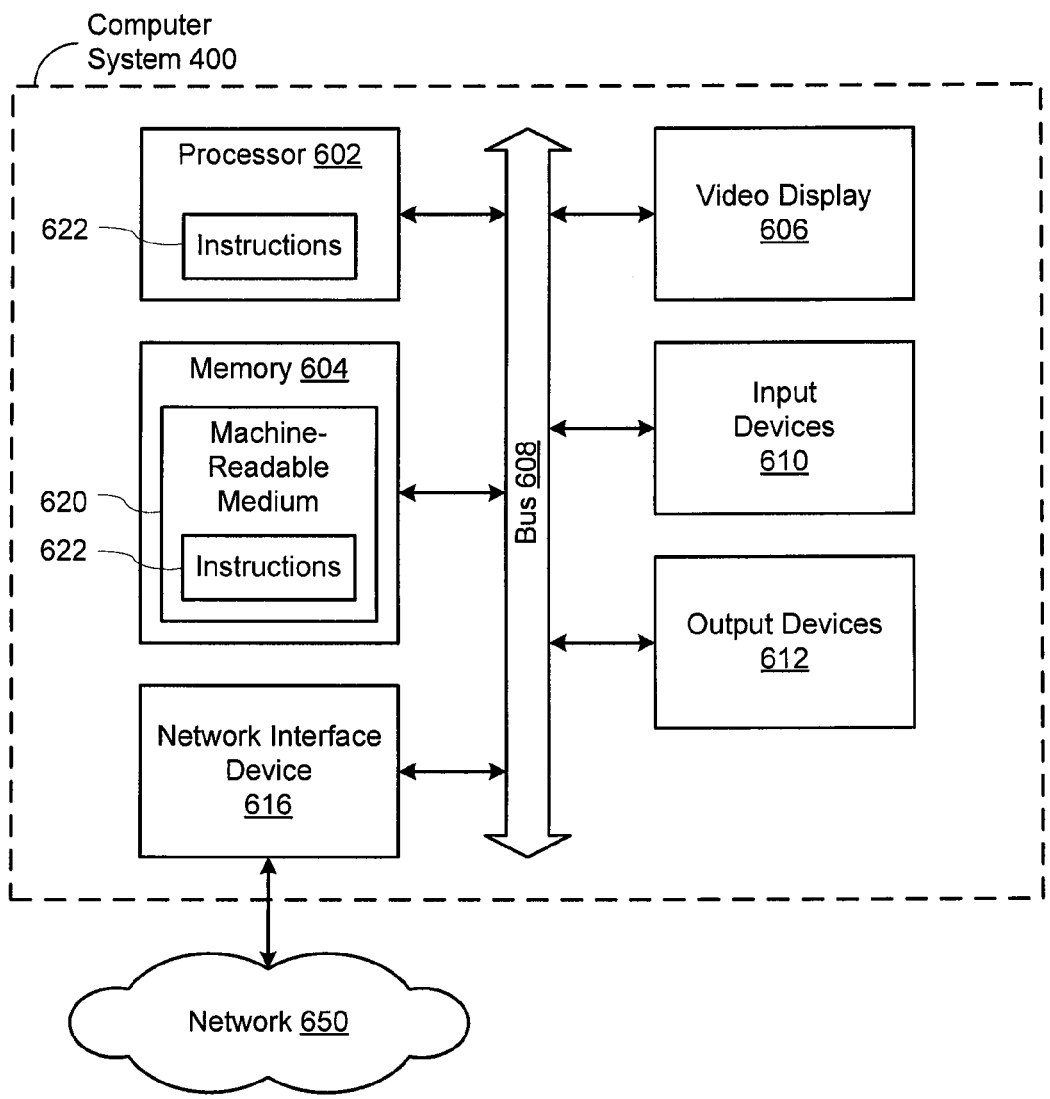
FIG. 6 is a block diagram illustrating an exemplary computer system, according to some embodiments.

FIG. 6 depicts a block diagram of a machine in the example form of a computer system 400 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computer system 400 includes a processor 602 (e.g., a central processing unit (CPU), a graphics processing unit (GPU) or both), and memory 604, which communicate with each other via bus 608. Memory 604 includes volatile memory devices (e.g., DRAM, SRAM, DDR RAM, or other volatile solid state memory devices), non-volatile memory devices (e.g., magnetic disk memory devices, optical disk memory devices, flash memory devices, tape drives, or other non-volatile solid state memory devices), or a combination thereof. Memory 604 may optionally include one or more storage devices remotely located from the computer system 400. The computer system 400 may further include video display unit 606 (e.g., a plasma display, a liquid crystal display (LCD) or a cathode ray tube (CRT)). The computer system 400 also includes input devices 610 (e.g., keyboard, mouse, trackball, touchscreen display, etc.), output devices 612 (e.g., speakers), and a network interface device 616. The aforementioned components of the computer system 400 may be located within a single housing or case (e.g., as depicted by the dashed lines in FIG. 6). Alternatively, a subset of the components may be located outside of the housing. For example, the video display unit 606, the input devices 610, and the output device 612 may exist outside of the housing, but be coupled to the bus 608 via external ports or connectors accessible on the outside of the housing.

Memory 604 includes a machine-readable medium 620 on which is stored one or more sets of data structures and instructions 622 (e.g., software) embodying or utilized by any one or more of the methodologies or functions described herein. The one or more sets of data structures may store data. Note that a machine-readable medium refers to a storage medium that is readable by a machine (e.g., a computer-readable storage medium). The data structures and instructions 622 may also reside, completely or at least partially, within memory 604 and/or within the processor 602 during execution thereof by computer system 400, with memory 604 and processor 602 also constituting machine-readable, tangible media.

The data structures and instructions 622 may further be transmitted or received over a network 650 via network interface device 616 utilizing any one of a number of well-known transfer protocols (e.g., HyperText Transfer Protocol (HTTP)). Network 650 can generally include any type of wired or wireless communication channel capable of coupling together computing nodes (e.g., the computer system 400). This includes, but is not limited to, a local area network, a wide area network, or a combination of networks. In some embodiments, network 650 includes the Internet.

Reporting a Synchronization Event

Figure 7:
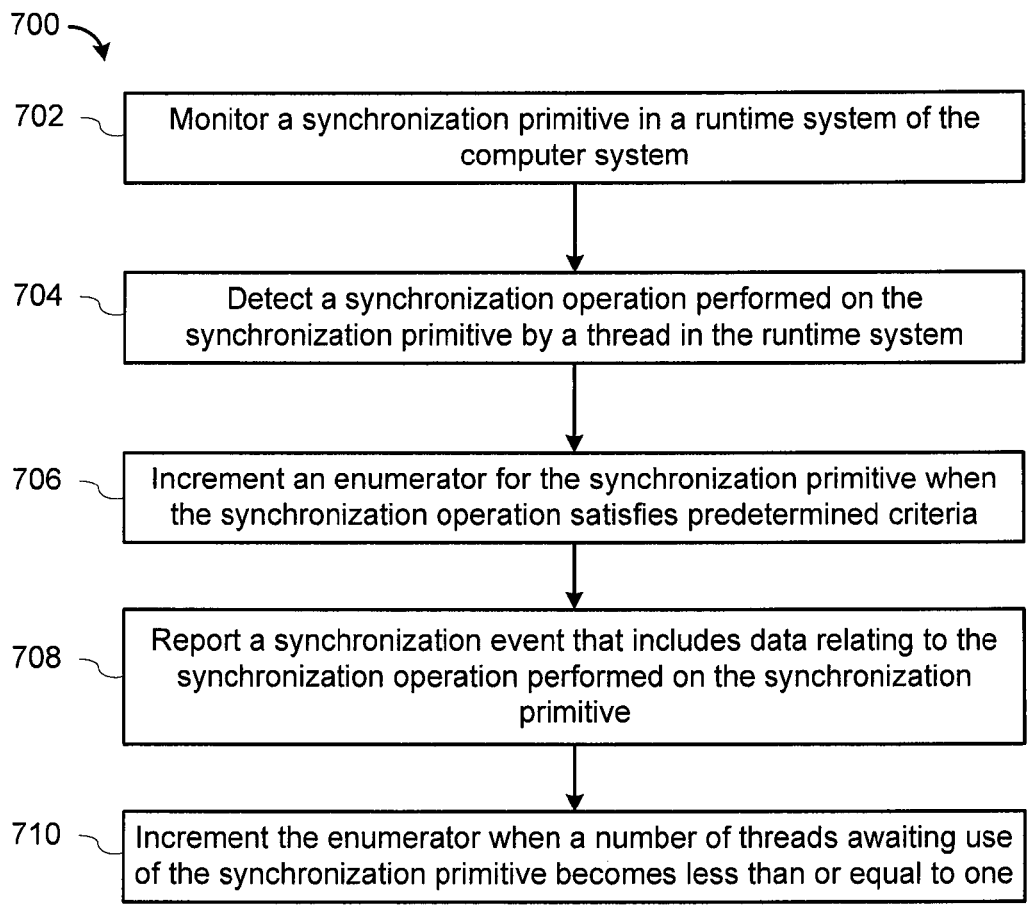
FIG. 7 is a flowchart of a method for reporting a synchronization event in a runtime system of a computer system, according to some embodiments.

FIG. 7 is a flowchart of a method 700 for reporting a synchronization event in a runtime system of a computer system, according to some embodiments. In some embodiments, the method 700 is performed by the synchronization monitoring module 410 of the runtime system module 402 in the computer system 400. The synchronization monitoring module 410 monitors (702) a synchronization primitive in a runtime system of the computer system. The synchronization monitoring module 410 then detects (704) a synchronization operation performed on the synchronization primitive by a thread in the runtime system. The synchronization monitoring module 410 increments (706) an enumerator for the synchronization primitive when the synchronization operation satisfies predetermined criteria. As discussed above, in some embodiments, the synchronization operation satisfies predetermined criteria when the synchronization operation is an operation that releases use of the synchronization primitive.

A synchronization primitive may be in an inflated or deflated state depending on the level of contention for the synchronization primitive. When the synchronization primitive is used at most by one thread at a time, the synchronization primitive is in a deflated state in which the internal data structure for the synchronization primitive and the executed synchronization code may be lightweight. When contention for the synchronization primitive occurs and/or increases, the synchronization primitive is inflated so that the threads that are waiting on the synchronization primitive can be registered. When the contention is resolved (e.g., only one or zero threads are using the synchronization primitive), the synchronization primitive returns to a deflated state. Whereas the synchronization primitive enters the inflated state at the time when the contention for the synchronization primitive occurs, there is no predetermined point in time or predetermined event at which the synchronization primitive returns to the deflated state. For performance reasons, it may be desirable to only report a synchronization event involving a synchronization primitive to the synchronization trace 500 when the synchronization primitive is under contention by two or more threads. Accordingly, in some embodiments, the synchronization primitive enumerator is only incremented (if at all) when the synchronization primitive is under contention by two or more threads. Since a synchronization primitive may change its state between deflated and inflated at any time depending on a current level of contention for the synchronization primitive, the synchronization primitive enumerator may or may not be incremented properly. Thus, in some embodiments, the deflation and inflation process of synchronization primitives is accounted for by incrementing the synchronization primitive enumerator during a deflation operation on a synchronization primitive. Doing so causes the value of the synchronization primitive enumerator to increase even if some synchronization events are not reported due to a lack of contention.

Returning to FIG. 7, the synchronization monitoring module 410 reports (708) a synchronization event that includes data relating to the synchronization operation performed on the synchronization primitive. For example, the synchronization monitoring module 410 reports the synchronization event to the synchronization trace 500. The data relating to the synchronization operation performed on the synchronization primitive includes, but is not limited to, a value of the enumerator for the synchronization primitive at a time the synchronization operation occurred, an identifier for the thread, an identifier for a current thread that has acquired use of the synchronization primitive, an identifier for a next thread that will acquire use of the synchronization primitive, a timestamp corresponding to a time at which the synchronization event occurred, an accumulated timestamp corresponding to an accumulated time during which a runtime system of the computer system has been executing runtime system operations, and a maximum amount of time that a thread may wait to acquire use of the synchronization primitive. In some embodiments, a value of the synchronization primitive enumerator is only reported for enter events and exit events. In some embodiments, an identifier of a thread currently using a synchronization primitive is only reported for enter events. In some embodiments, an identifier of a thread that will acquire use of the synchronization primitive is reported for exit events.

Certain embodiments are described herein as including logic or a number of components, modules, or mechanisms. Modules may constitute either software modules (e.g., code and/or instructions embodied on a machine-readable medium or in a transmission signal) or hardware modules. A hardware module is a tangible unit capable of performing certain operations and may be configured or arranged in a certain manner. In example embodiments, one or more computer systems (e.g., the computer system 400) or one or more hardware modules of a computer system (e.g., a processor 602 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 602 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 602 configured using software, the general-purpose processor 602 may be configured as respective different hardware modules at different times. Software may accordingly configure a processor 602, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 602 that are temporarily configured (e.g., by software, code, and/or instructions stored in a machine-readable medium) or permanently configured to perform the relevant operations. Whether temporarily or permanently configured, such processors 602 may constitute processor-implemented (or computer-implemented) modules that operate to perform one or more operations or functions. The modules referred to herein may, in some example embodiments, comprise processor-implemented (or computer-implemented) modules.

Moreover, the methods described herein may be at least partially processor-implemented (or computer-implemented) and/or processor-executable (or computer-executable). For example, at least some of the operations of a method may be performed by one or more processors 602 or processor-implemented (or computer-implemented) modules. Similarly, at least some of the operations of a method may be governed by instructions that are stored in a computer readable storage medium and executed by one or more processors 602 or processor-implemented (or computer-implemented) modules. The performance of certain of the operations may be distributed among the one or more processors 602, not only residing within a single machine, but deployed across a number of machines. In some example embodiments, the processors 602 may be located in a single location (e.g., within a home environment, an office environment or as a server farm), while in other embodiments the processors 602 may be distributed across a number of locations.

While the embodiment(s) is (are) described with reference to various implementations and exploitations, it will be understood that these embodiments are illustrative and that the scope of the embodiment(s) is not limited to them. In general, techniques for reporting a synchronization event in a runtime system of a computer system may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and its practical applications, to thereby enable others skilled in the art to best utilize the embodiments and various embodiments with various modifications as are suited to the particular use contemplated.

What is claimed is:

1. A computer-implemented method for reporting a synchronization event in a runtime system of a computer system, the method comprising:
    monitoring, in the runtime system of the computer system, a synchronization primitive that guards a shared data structure by allowing a single thread at a time to execute a critical section of code that requires use of the shared data structure;
    detecting a synchronization operation performed on the synchronization primitive by a particular thread in the runtime system that requested use of the synchronization primitive that guards the shared data structure;
    incrementing an enumerator for the synchronization primitive based on a release of the synchronization primitive that is in the inflated state while refraining from incrementing the enumerator for the release of the synchronization primitive in the deflated state, the inflated state occurring based on having at least two other threads awaiting use of the synchronization primitive, the deflated state occurring based on at most one thread using the synchronization primitive and having less than two other threads awaiting use of the synchronization primitive; and reporting, by a processor of the computer system, a synchronization event that includes data relating to the synchronization operation performed on the synchronization primitive that guards the shared data structure, the data being reported including a value of the enumerator for the synchronization primitive at a time the synchronization operation occurred.

2. The computer-implemented method of claim 1, wherein the monitoring of the synchronization primitive is performed by monitoring functions provided by the runtime system of the computer system.

3. The computer-implemented method of claim 1, wherein the synchronization event is reported to a synchronization trace that includes synchronization events corresponding to synchronization operations performed by threads including the particular thread in the runtime system.

4. The computer-implemented method of claim 1, wherein the synchronization operation is selected from the group consisting of:
 requesting use of the synchronization primitive;
 acquiring use of the synchronization primitive; and
 releasing use of the synchronization primitive.

5. The computer-implemented method of claim 1, wherein the synchronization event is selected from the group consisting of:
 an enter event corresponding to a time when the thread attempts to enter the critical section by requesting use of the synchronization primitive;
 an entered event corresponding to a time when the thread enters the critical section by acquiring use of the synchronization primitive;
 an exit event corresponding to a time when the thread exits the critical section by releasing use of the synchronization primitive;
 a wait event corresponding to a time when the thread starts waiting for a change in a state of the synchronization primitive;
 a waited event corresponding to a time when the thread has finished waiting for the change in the state of the synchronization primitive; and
 a notify event corresponding to a time when the thread attempts to notify at least one other thread that the state of the synchronization primitive has changed.

6. The computer-implemented method of claim 1, wherein the synchronization primitive is selected from the group consisting of:
 a mutex;
 an object monitor;
 a lock;
 a cyclic barrier; and
 a latch.

7. The computer-implemented method of claim 1, wherein the data relating to the synchronization operation performed on the synchronization primitive is selected from the group consisting of:
 an identifier for the thread;
 an identifier for a current thread that has acquired use of the synchronization primitive;
 an identifier for a next thread that will acquire use of the synchronization primitive;
 a timestamp corresponding to a time at which the synchronization event occurred;
 an accumulated timestamp corresponding to an accumulated time during which the runtime system of the computer system has been executing runtime system operations; and
 a maximum amount of time that the particular thread may wait to acquire use of the synchronization primitive.

8. The computer-implemented method of claim 1, wherein the reporting the synchronization event comprises reporting a value of the synchronization primitive enumerator for enter events and exit events.

9. The computer-implemented method of claim 1, wherein the reporting the synchronization event comprises reporting, for an enter event, an identifier of a thread currently using the synchronization primitive.

10. The computer-implemented method of claim 1, wherein the reporting the synchronization event comprises reporting, for an exit event, an identifier of a thread that will acquire use of the synchronization primitive.

11. A system for reporting a synchronization event in a runtime system of a computer system, comprising:
 at least one processor;
 memory; and
 at least one program stored in the memory, the at least one program comprising instructions to perform operations comprising:
  monitoring, in the runtime system of the computer system, a synchronization primitive that guards a shared data structure by allowing a single thread at a time to execute a critical section of code that requires use of the shared data structure;
  detecting a synchronization operation performed on the synchronization primitive by a particular thread in the runtime system that requested use of the synchronization primitive that guards the shared data structure;
  incrementing an enumerator for the synchronization primitive based on a release of the synchronization primitive that is in the inflated state while refraining from incrementing the enumerator for the release of the synchronization primitive in the deflated state, the inflated state occurring based on having at least two other threads awaiting use of the synchronization primitive, the deflated state occurring based on at most one thread using the synchronization primitive and having less than two other threads awaiting use of the synchronization primitive; and
  reporting a synchronization event that includes data relating to the synchronization operation performed on the synchronization primitive that guards the shared data structure, the data being reported including a value of the enumerator for the synchronization primitive at a time the synchronization operation occurred.

12. The system of claim 11, wherein the monitoring of the synchronization primitive is performed by monitoring functions provided by the runtime system of the computer system.

13. The system of claim 11, wherein the synchronization event is reported to a synchronization trace that includes synchronization events corresponding to synchronization operations performed by threads including the particular thread in the runtime system.

14. The system of claim 11, wherein the synchronization operation is selected from the group consisting of:
 requesting use of the synchronization primitive;
 acquiring use of the synchronization primitive; and
 releasing use of the synchronization primitive.

15. The system of claim 11, wherein the synchronization event is selected from the group consisting of:

an enter event corresponding to a time when the thread attempts to enter the critical section by requesting use of the synchronization primitive;

an entered event corresponding to a time when the thread enters the critical section by acquiring use of the synchronization primitive;

an exit event corresponding to a time when the thread exits the critical section by releasing use of the synchronization primitive;

a wait event corresponding to a time when the thread starts waiting for a change in a state of the synchronization primitive;

a waited event corresponding to a time when the thread has finished waiting for the change in the state of the synchronization primitive; and a notify event corresponding to a time when the thread attempts to notify at least one other thread that the state of the synchronization primitive has changed.

16. The system of claim 11, wherein the synchronization primitive is selected from the group consisting of:

a mutex;
an object monitor;
a lock;
a cyclic barrier; and
a latch.

17. The system of claim 11, wherein the data relating to the synchronization operation performed on the synchronization primitive is selected from the group consisting of:

an identifier for the thread;

an identifier for a current thread that has acquired use of the synchronization primitive;

an identifier for a next thread that will acquire use of the synchronization primitive;

a timestamp corresponding to a time at which the synchronization event was emitted to a synchronization trace;

an accumulated timestamp corresponding to an accumulated time during which the runtime system of the computer system has been executing runtime system operations; and a maximum amount of time that the particular thread may wait to acquire use of the synchronization primitive.

18. A physical machine-readable storage device storing at least one program configured for execution by a processor of a machine, the at least one program comprising instructions that when executed by the processor cause the machine to perform operations comprising:

monitoring, in a runtime system of a computer system, a synchronization primitive that guards a shared data structure by allowing a single thread at a time to execute a critical section of code that requires use of the shared data structure;

detecting a synchronization operation performed on the synchronization primitive by a particular thread in the runtime system that requested use of the synchronization primitive that guards the shared data structure;

incrementing an enumerator for the synchronization primitive based on a release of the synchronization primitive that is in the inflated state while refraining from incrementing the enumerator for the release of the synchronization primitive in the deflated state, the inflated state occurring based on having at least two other threads awaiting use of the synchronization primitive, the deflated state occurring based on at most one thread using the synchronization primitive and having less than two other threads awaiting use of the synchronization primitive; and reporting a synchronization event that includes data relating to the synchronization operation performed on the synchronization primitive that guards the shared data structure, the data being reported including a value of the enumerator for the synchronization primitive at a time the synchronization operation occurred.

* * * * *